July 22, 1941. W. H. FULTON 2,249,951
ENERGY TRANSMISSION MEANS
Filed Dec. 4, 1939
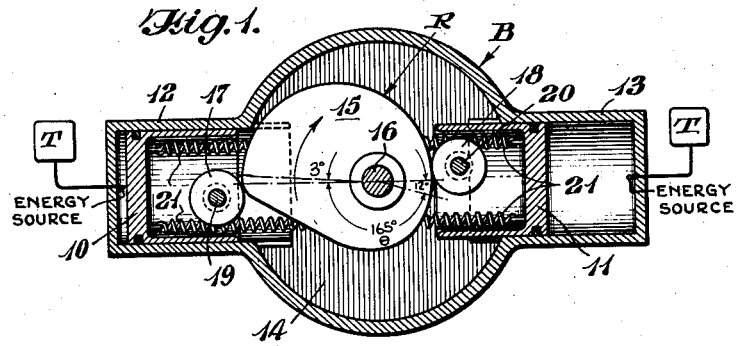
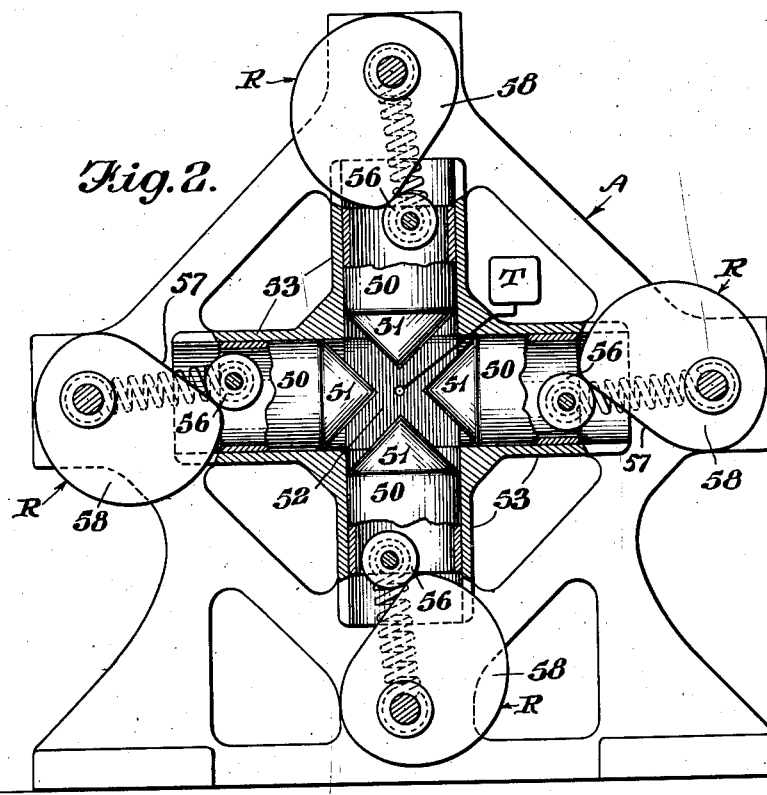
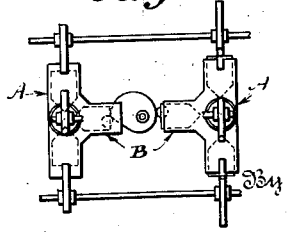
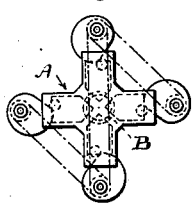

Patented July 22, 1941

2,249,951

UNITED STATES PATENT OFFICE 2,249,951

ENERGY TRANSMISSION MEANS

William H. Fulton, Virginia, Minn., assignor of one-third to M. S. Kingston, one-third to Ernest Metcalfe, and one-third to himself, all of Virginia, Minn.

Application December 4, 1939, Serial No. 307,522

3 Claims. (Cl. 121—120)

This invention relates to the utilization of energy released by gases or vapors under relatively high pressures such as evolved in explosions of combustible fuels, in steam boilers or the like and more particularly the invention relates to engines or motors capable of reacting to initial energy release from a fluid power medium.

This application is a continuation in part of my copending application Ser. No. 264,829 filed March 29, 1939.

Prior to the instant invention, steam engines, internal combustion engines operating on the Otto, Diesel, or other cycles involved a conventional crank or its equivalent and a reciprocating piston operating in a cylinder associated with said crank. Either an explosion or the admission of high pressure steam, as the case might be, on one side of the piston effected its movement and corresponding rotation of the crank due to the expansion of gases or vapors against the piston. At the time the energy is initially applied to the piston it is on dead center or substantially close to dead center whereby when the gas or vapor is at its highest pressure the leverage applied to the driven shaft is a minimum and when the crank is rotated 90° the leverage on the said shaft is at a maximum and the pressure of the gases or vapors applied to the piston is then approaching a minimum. The power or the energy driving the piston to effect rotation of the crank may be measured in work done on the piston in accordance with the product of the mean effective pressure times the length of the stroke.

It is an object of the instant invention to provide an energy transmission means capable of absorbing and transmitting a maximum of energy released by high pressure medium such as exploding or high pressure gases or vapors.

It is another object of the instant invention to provide an engine capable of transmitting energy from a source including not only that portion which is ordinarily available for transmission by conventional means but also energy which is ordinarily unavailable for transmission, such as for example a substantial amount of the initial release of energy at the time of the explosion in a conventional internal combustion engine wherein the transmission means involves a conventional crank and connecting rod.

It is a further object of the instant invention to provide an engine involving in its transmission means maximum leverage when the energy released from the power medium is at its maximum.

A further object of the instant invention is to provide an engine having a rotating driven shaft capable of reacting to the force of detonating or expanding gases in a manner such as to produce greater power at a slower rate of revolution and per revolution of the engine shaft.

Other objects and the nature and advantages of the invention will be apparent from the following description taken in conjunction with the accompanying drawing, wherein:

Fig. 1 is a diagrammatic view in section of a two cylinder reciprocating piston engine in accordance with the invention;

Fig. 2 is a diagrammatic sectional view of a four cylinder engine in accordance with the invention;

Fig. 3 is a schematic side elevational view of a ten cylinder engine in accordance with the invention; and Fig. 4 is a schematic end view of the engine illustrated in Fig. 3.

Referring to Fig. 1 a pair of pistons 10 and 11 respectively are associated with a pair of corresponding cylinders 12 and 13 respectively. A crank case 14 connects the two cylinders and serves as a housing for the cam 15 which is mounted on driven shaft 16. The rollers 17 and 18 respectively are rotatably mounted on pins 19 and 20 respectively which are each secured to their corresponding pistons 10 and 11 respectively. The springs 21 secured to the interiors of the pistons 10 and 11 serve to hold the rollers 19 and 20 against the surface of the cam 15 but do not interfere with the power strokes of the pistons as the spring is always under tension serving to pull the two pistons together. Equivalent means may be substituted for the springs 21 which are illustrated to show one way of holding the piston rollers against the cam surfaces. It is conceivable, for example, that the rollers may run in an enclosed groove on a cam, the groove having an outline corresponding to the surface of the cam 15 thereby obviating the necessity for the springs 21. When springs are utilized there may be four in number, two on each side of the cam 15.

The engine may be powered by steam or it may be of the internal combustion type operable on the Otto, Diesel or other cycle. If the latter is the case the engine may be of the two cycle or four cycle type. It is to be understood that conventional valves and timing means therefor, and conventional spark plugs and spark timing mechanism, may be incorporated in the engines in accordance with conventional practice when desired. The timing mechanism T illustrated in Figs. 1 and 2 serves to effect the release of energy through the energy source at substantially the initial portion of the power stroke. When the energy source is a steam inlet the timing mechanism may include a valve control and when the energy source involves the explosion of a combustible medium the timing mechanism T may involve a spark plug or its equivalent and electrical timing means therefor to effect the explosion of the combustible medium at substantially the initial portion of the power stroke.

With the cam 15 in the position shown, the piston 10 may be considered as beginning its power stroke which will continue as the cam 15 rotates in the direction shown by the arrow for 165° angular rotation. It is to be noted that the axes of the rollers 17 and 18 may be out of the plane including the axes of the cylinders when desired, but they may, in accordance with the invention, preferably be in the said plane. The contour of the surface of the cam 15 is such that a maximum of leverage is exerted on the driven shaft 16 substantially at the beginning of the stroke, which high leverage continues for a substantial period over the major first half portion of the stroke and from a predetermined time (approximately 18° after dead center) the leverage gradually diminishes through approximately 150° to zero. In other words, the relation of leverage to the position of the piston travelling in its power stroke is such that the leverage is at a maximum at approximately 18° after dead center of the stroke, and though uniformly decreasing, continues to be above average over a substantial period thereof. From said predetermined time the leverage gradually diminishes in a manner contrary to conventional engine construction wherein the leverage applied to the driven shaft is at a minimum at the beginning of the stroke and a maximum at the middle of the stroke whereupon the leverage again diminishes. It would appear that the relation of piston position with respect to the stroke and to the leverage applied to the driven shaft is one of pure chance in conventional engine construction, whereas in accordance with the instant invention this relation is in accordance with a predetermined plan wherein maximum leverage occurs at a time and position when the energy source contains and is releasing the most energy, and during the latter part of the stroke when the energy source is more or less exhausted the leverage continues its gradual decrease on a spiral or spiral-like curve.

As illustrated in Fig. 1, the cam 15 applies leverage to the driven shaft through 165° of the power stroke denoted on the drawing by the Greek letter θ, the latter 150° of which approximates a uniformly decreasing spiral contour on the cam surface. The initial portion of the stroke takes place relatively quickly with increasingly small rotation of the cam and driven shaft by virtue of the external configuration of the cam 15. Relatively great stroke difference effected by relative great energy release and increasingly small rotation of the shaft denotes a maximum leverage condition inherent in the invention. With the arrangement described, each piston of the engine reacts to detonating or expanding gases in a manner such as to produce more power at a relatively greater refrigeration effect than when the piston moves in the harmonic motion corresponding to conventional engines including connecting rods and crank-pins.

The engine in the instant invention involves an approximately uniform rate of decrease in piston speed for approximately 150° of rotation of the engine shaft. This is one significant feature of the invention. The momentum-decrease of energy units in the time dimension and the three conventional dimensions of volume pressure, all four of which are approximately uniform, makes for a four dimensional efficiency maximum never heretofore accomplished in engine design. The energy losses due to impact in other cam engine or conventional engine design resulting from cam disturbance or other disturbance are in the engine in accordance with the instant invention absorbed into effective torque. That portion R of the cam 15 corresponds to the return stroke of the pistons and is generally rounded as compared with the steep portion of the cam which corresponds to the power stroke in order that the operation of the engine may be rhythmic and smooth.

Referring to Fig. 2, four pistons 50 having pointed ends 51 extending into the combustion chamber 52 receive energy from a fluid power medium therein and move outwardly simultaneously. The pistons 50 are mounted to reciprocate within cylinders 53. The reciprocation of the pistons 50 outwardly effects rolling of the rollers 56 against the relatively steep portions of the rotating cams 58. The pistons are returned to their original positions by the eccentric contours of the cams 58. That portion R of the cams 58 corresponds to the return stroke of the piston and is relatively rounded as compared with that of the steep portion of the cam which corresponds to the power stroke of the piston. The contours of the cam as shown assure a rhythmic operation of the engine which makes for relatively high efficiency. The relation of piston position to leverage applied to the driven shaft is the same in this form of the invention as in the embodiment illustrated in Fig. 1 and the surface portion 57 of the cam 58 corresponds to the surface of the cam 15 for maximum leverage on the driven shaft is effected when the energy source is releasing maximum energy and minimum leverage on the driven shaft is applied when the energy source is more or less exhausted. One advantage inherent in the embodiment in Fig. 2 over that illustrated in Fig. 1 lies in the fact that a single combustion space effects movement of a plurality of pistons outwardly and more of the initial release of energy is available for transmission to the driven shaft because the relative motion of the pistons with respect to the fluid power medium is multiple. The initial release of energy from the power medium, if it is to be absorbed by the driven shaft, must be absorbed quickly; i. e., a time factor is involved, which time factor is more or less better utilized when a construction such as depicted in Fig. 2 is utilized instead of that shown in Fig. 1.

Though the engine illustrated in Fig. 2 contains but four cylinders, it is to be understood that it is within the scope of the instant invention to utilize a series of units A, such as shown in Fig. 2, or a combination involving two units A with which unit B, such as shown in Fig. 1. Such a ten cylinder combination is shown in Figs. 3 and 4. The five driven shafts of this arrangement may be suitably connected in driving relation to a single driven shaft by a suitable power transmission, not shown, which forms no part of the instant invention, whereby the power derived from each moving piston may be transferred to a main shaft. Though the engine illustrated in Figs. 3 and 4 contains but ten cylinders, a twenty cylinder engine is contemplated and comprises two ten cylinder engines connected with the cylinders having horizontal axis or in axial alignment and with all the driven shafts suitably connected so as to drive one or more main shafts. A twenty-four cylinder engine is also contemplated and involves four units A arranged in parallel (as in Fig. 3), two units B each arranged as shown in Fig. 3, and four individual cylinders each arranged at the ends of the outside units A and similarly perpendicular to their planes as are the B units. In other words the twenty-four cylinder assembly would utilize two twelve cylinder units entirely separated except for their four common parallel shafts. Four other transverse shafts, one for each end cylinder and two more transverse shafts, one each for the two units B. The twenty cylinder assembly would utilize four or five cylinder units. Any multiple of A or Fig. 2 could be arranged on four parallel shafts. The 240° overlapping of power strokes would begin with three units A so arranged.

The engine in accordance with the invention is designed to transmit energy released at the instant when the same is initially released. In the case of an internal combustion engine the cam will transmit a more or less large proportion of the energy released at the instant of the explosion. In present day motor cars the fuel is adulterated with an anti-knock mixture which serves to kill the initial power release which is apparently objectionable in an automobile engine because of their conventional design which is incapable of absorbing the power causing the knock. When the instant invention is applied to internal combustion engines the use of anti-knock adulterants in the fuel will be obviated as the energy causing the knock will be utilized and additional power heretofore wasted will be transmitted. The same effect takes place in a steam engine, but perhaps to a lesser extent. One of the important features of the instant invention involves a design of a transmission means between the piston and the driven shaft that will most effectively re-act to energy releases from a fluid power medium and accordingly the contour of the cam 15 and the cam portion 57 is such as to permit a higher piston velocity over a greater time portion of the turning circle and which contour characteristics are such as to reduce the linear travel of the piston to the lowest possible minimum consistent with a high power output. In other words the invention incorporates the feature of a minimum volume engine capable of absorbing energy released from a fluid power medium relatively quickly over at least a portion of the stroke, which energy would otherwise be unavailable and also absorb energy from retarding initial inertial speed of moving piston into torque over the latter part of the stroke in order to insure maximum power transmission.

While two, four and ten cylinder engines have been illustrated in the drawing, it is to be understood that any desired number of cylinders may be employed in groups or units as described. It is also to be understood that the forms of the invention selected for illustration and description are to be considered as the preferred form and that other forms incorporating the herein disclosed invention may be utilized without departing from the spirit of the invention.

It will be obvious to those skilled in the art that various changes may be made in this device without departing from the spirit of the invention and therefore the invention is not limited to what is shown in the drawing and described in the specification but only as indicated in the appended claims.

What is claimed is:

1. A motor comprising a plurality of pistons, for example, in units of four, five or six, mounted for reciprocation in right angling directions radiating from a minimum plurality of centers-in-a-line axis and operative to effect rotation of a plurality of cams integral with shafts, a plurality of cylinders cooperating respectively with said pistons, cam surfaces having a power stroke portion, means for associating units of four (or five or more if more composes a unit from one explosion) of said pistons with said power stroke portion, the contour of said power stroke portion being such as to effect application of maximum leverage toward rotation of one shaft called main shaft, through connection by belting or other suitable means with each of the four or more integral shafts and cams associated with their respective cylinders or cylinder, pistons and rollers during the substantial initial portion of piston stroke and gradually diminishing leverage during 150° of effective torque related to said piston stroke.

2. A motor comprising a piston, a cylinder element in cooperating relation to said piston, a cam element, one of said two elements being rotatable with respect to the other, a variable energy source associated with said piston, a driven shaft connected to said one element, said variable energy source emanating energy at a maximum rate during one portion of the piston stroke cycle, said cam acting to transmit energy from said piston to said rotating shaft and having a first portion of such contour as to effect maximum leverage on said shaft during the period of maximum energy release, a second portion having such contour as to effect gradually decreasing leverage during the remainder of the power stroke and a third portion having such contour as to effect the gradual return of the piston to the beginning of the first portion corresponding to maximum energy release.

3. The structure recited in claim 2, said cam being the rotatable element connected to said shaft, said first portion of said cam comprising a relatively flat part extending from a point relatively remote from the center of rotation and extending generally toward but to a point spaced from the center of rotation, said second portion comprising a spiral shaped part gradually leading toward said center of rotation, and said third portion comprising a generally elliptical shaped part gradually leading from adjacent said second portion to adjacent the beginning of said first portion.

WILLIAM H. FULTON.